United States Patent
Visuri et al.

(10) Patent No.: US 8,175,036 B2
(45) Date of Patent: May 8, 2012

(54) MULTIMEDIA WIRELESS DISTRIBUTION SYSTEMS AND METHODS

(75) Inventors: Pertti Visuri, Carlsbad, CA (US); Randy Salo, Carlsbad, CA (US); Christian van Hamersveld, Carlsbad, CA (US); Robert Frazier, Carlsbad, CA (US)

(73) Assignee: Airgain, Inc., Carlsbad, CA (US)

( * ) Notice: Subject to any disclaimer, the term of this patent is extended or adjusted under 35 U.S.C. 154(b) by 614 days.

(21) Appl. No.: 12/347,285

(22) Filed: Dec. 31, 2008

(65) Prior Publication Data

US 2009/0175221 A1    Jul. 9, 2009

Related U.S. Application Data

(60) Provisional application No. 61/018,793, filed on Jan. 3, 2008, provisional application No. 61/089,990, filed on Aug. 19, 2008.

(51) Int. Cl.
*H04W 4/00* (2009.01)
(52) U.S. Cl. ......................................... 370/328; 370/329
(58) Field of Classification Search ........................ None
See application file for complete search history.

(56) References Cited

U.S. PATENT DOCUMENTS

| | | | | |
|---|---|---|---|---|
| 5,809,078 A * | 9/1998 | Tani et al. | ...................... | 375/259 |
| 2002/0118706 A1* | 8/2002 | Narayana | ...................... | 370/508 |
| 2003/0086427 A1 | 5/2003 | Lee | | |
| 2005/0058107 A1* | 3/2005 | Salokannel et al. | .......... | 370/338 |
| 2005/0163048 A1* | 7/2005 | Arora et al. | .................... | 370/230 |
| 2006/0141946 A1* | 6/2006 | Rush et al. | ...................... | 455/92 |
| 2006/0146753 A1* | 7/2006 | Park et al. | ...................... | 370/331 |
| 2006/0206917 A1* | 9/2006 | Maeda et al. | .................. | 725/151 |

FOREIGN PATENT DOCUMENTS

| KR | 10-2000-0026465 | 5/2000 |
|---|---|---|
| KR | 10-2001-0095517 | 11/2001 |
| KR | 10-2006-0039843 | 5/2006 |

OTHER PUBLICATIONS

International Search Report and Written Opinion as issued in International Patent Application No. PCT/US2008/088615 on Jun. 1, 2009.

* cited by examiner

*Primary Examiner* — John Blanton (74) *Attorney, Agent, or Firm* — Clause Eight IPS; Michael Catania (57) ABSTRACT

An access point for wireless transmission of packets to user devices includes an application module and a radio module. If the radio module fails to successfully transmit a packet to a user device, the application module takes the packet from its queue and places it in the radio buffer for retransmission. This greatly increases the speed of retransmission. The application module can obtain information on the success of transmitting the packet directly from the radio module.

5 Claims, 7 Drawing Sheets

MULTIMEDIA WIRELESS DISTRIBUTION SYSTEMS AND METHODS

RELATED APPLICATIONS

This application claims the benefit of U.S. Provisional Patent Application Ser. No. 61/018,793, filed Jan. 3, 2008, entitled "Improved Multimedia Wireless Distribution Systems and Methods" and U.S. Provisional Patent Application Ser. No. 61/089,990, filed Aug. 19, 2008, entitled "Improved Multimedia Wireless Distribution Systems and Methods", which are incorporated herein by reference in their entirety.

BACKGROUND

1. Field

This invention relates generally to wireless distribution systems and to private or residential wireless distribution systems.

2. Background

It was not all that long ago that most televisions ("TVs") simply had internal antennas that picked up broadcast signals and displayed video within the acceptable quality range for most people. But the advent of cable and then satellite TV changed all that, raising expectations both in terms of picture quality and the number of channels available.

Cable distribution has proven inconvenient for many people with wireless communication in the home, whether for computer data, audio, or telephony. The next logical step is to stream video wirelessly. But the exponentially greater amount of data involved—particularly for high-definition TV ("HDTV")—introduces a higher order of difficulty, and the question of whether wireless video will ever become more than a niche market remains. Consumers might want a wireless video distribution solution, but most will not pay extravagantly for it. The challenge is to create equipment that can handle these huge amounts of information at a reasonable price.

SUMMARY

In one embodiment, a method for operating an access point is disclosed. A method of operating an access point having a radio module and an application module can include receiving the information packet at the application module and storing it in a queue, passing the information packet from the queue to a radio buffer for transmission to the user device, and transmitting the information packet from the buffer by a radio module to a user device. The radio module determines whether the information packet was successfully received at the user device. The application module receives information from the radio module indicating whether the information packet was successfully received by the user device. The information packet is passed from the queue into the buffer for retransmission by the radio module if the information packet was not successfully received at the user device.

In a further embodiment, if the information packet was successfully received by the user device, then it is removed the information packet from the queue.

Additionally, determining at the radio module whether the information packet was successfully received at the user device can include determining whether an acknowledgement message was received from the user device within a time limit.

Further, determining at the radio module whether the information packet was successfully received at the user device can include determining whether a negative acknowledgment message was received from the user device.

In a further aspect determining at the radio module whether the information packet was successfully received at the user device includes the radio module making at least one retransmission attempt if a first transmission attempt was not successful.

In a further aspect the method includes deleting the information packet from the queue when the information packet reaches a predetermined age.

A further embodiment is an access point device for providing an information packet to a user device. The access device comprises an application module with an information management module, a queue, and a buffer. The application module is configured to receive an information packet for transmission to an intended recipient. The device also includes a radio module configured to transmit the information packet stored in the buffer to the user device and to determine if the information packet was successfully received at the user device. The information management module is configured to store the information packet in the queue and pass the information packet from the queue to the buffer for transmission by the radio module to the user device, receive information from the radio module indicating whether the information packet was successfully received by the intended recipient, and pass the information packet from the queue into the buffer for retransmission by the radio module if the information packet was not successfully received at the user device.

In a further aspect, if the information packet was successfully received by the intended recipient, then information management module is configured to delete the packet from the queue.

In a further aspect, the radio module is further configured to provide an indication that the packet was not received by the intended recipient if the radio module does receive an acknowledgement from the intended recipient within a predetermined time period. Additionally, the radio module is further configured to provide an indication to the information management module that the packet was not received by the intended recipient when the radio module receives a negative acknowledgment from the intended recipient.

In a further aspect, the information management module is a proxy module, the proxy module implementing a proxy instance for each user device application, each proxy instance being created when a session is initiated for the associated user device application.

In a further aspect the information packet is transmitted to the access point by a media server and the information management module is configured to stop the information packet being received at the application module by sending a command to the media server to stop the flow of information packets from the media server. Additionally, the information management module comprises a filter module configured to filter packets for defined recipients and the filter module sends the command to the media server to stop the flow of information packets from the media server by sending a command that appears to the media server to have been sent from the intended recipient.

In a further aspect the information management module is configured to delete an information packet from the queue when the information packet within the queue reaches a predetermined age.

Other features and advantages of the present invention should be apparent after reviewing the following detailed description and accompanying drawings which illustrate, by way of example, aspects of the invention.

BRIEF DESCRIPTION OF THE DRAWINGS

Aspects, advantages and details of the present invention, both as to its structure and operation, may be gleaned in part by a study of the accompanying drawings, in which like reference numerals refer to like parts. The drawings are not necessarily to scale, emphasis instead being placed upon illustrating the principles of the invention.

DETAILED DESCRIPTION OF THE EMBODIMENTS

Certain embodiments as disclosed herein provide for methods and systems for communication over a wireless air interface. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
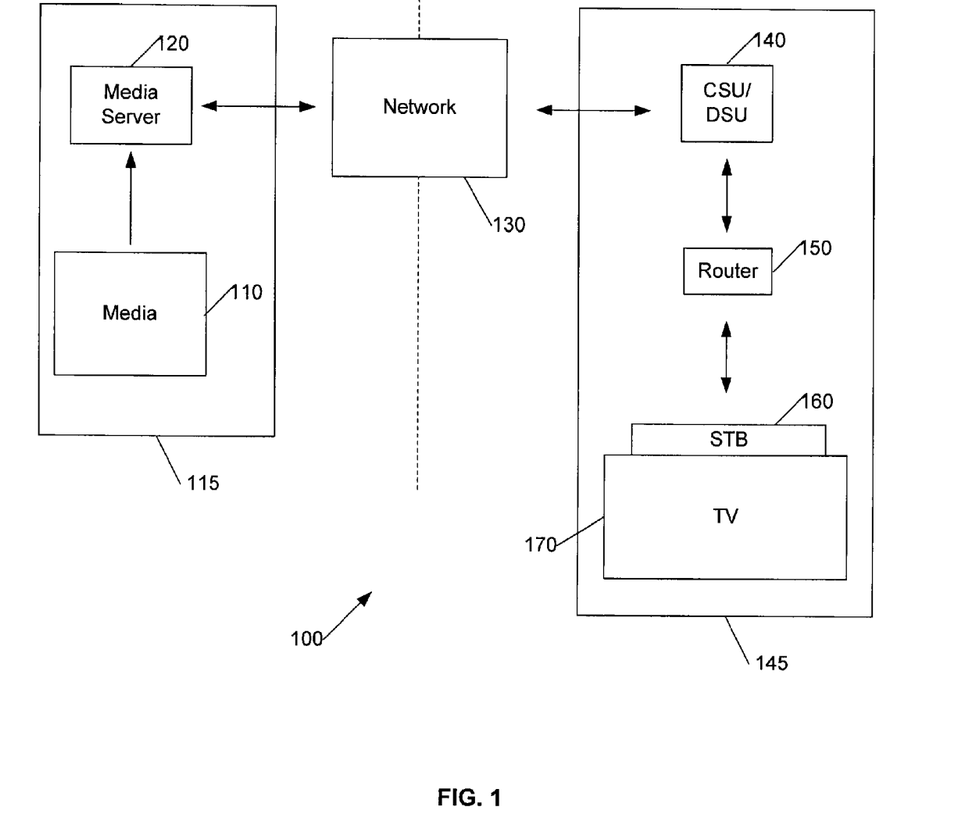
FIG. 1 is a block diagram of an exemplary multimedia distribution network.

FIG. 1 is a block diagram of an exemplary multimedia distribution network 100. Multimedia distribution network 100 includes a content distribution site 115 and a user or home site 145. Content distribution site 115 includes a media source 110 and a media server 120. Media source 110 can be, for example, an array of hard drives on which the digital media to be distributed is stored. The media can be video, audio or other types of data. In one embodiment, the media is audio visual, such as movies and television programs. Media source 110 is in communication with the media server 120. Media server 120 can be, for example, a video server system, such as those used by cable television and telephone network operators.

The content distribution site 115 communicates with recipients of the media distribution service (e.g., user or home site 145) by an intervening network 130. Intervening network 130 can be public or private networks, local area or wide area networks in multi-unit dwellings or other large facilities, the internet, cable television distribution network or other similar networks or combination of networks. In a preferred embodiment, intervening network 130 is the internet.

User or home site 145 is in communication with content distribution site 115 by network 130. In this example, home site 145 includes a channel service unit ("CSU")/data service unit ("DSU") 140, a router 150, a set top box (STB) 160, and a TV 170. In some embodiments, the CSU provides a connection to a digital line. The DSU typically performs protective and diagnostic functions for the communication line. The combination CSU/DSU 140 can be referred to collectively as a modem.

Router 150 can be used to distribute information, including media, to and from various devices on the home site 145 of the network 100. In the exemplary system depicted in FIG. 1, STB 160 is merely one example of a device which can transmit information to and from router 150 or, alternatively, directly to and from CSU/DSU 140. An additional example includes a media player software application on a personal computer (not shown) connected to router 150 or CSU/DSU 140. As shown, TV 170 is in communication with STB 160.

Figure 2:
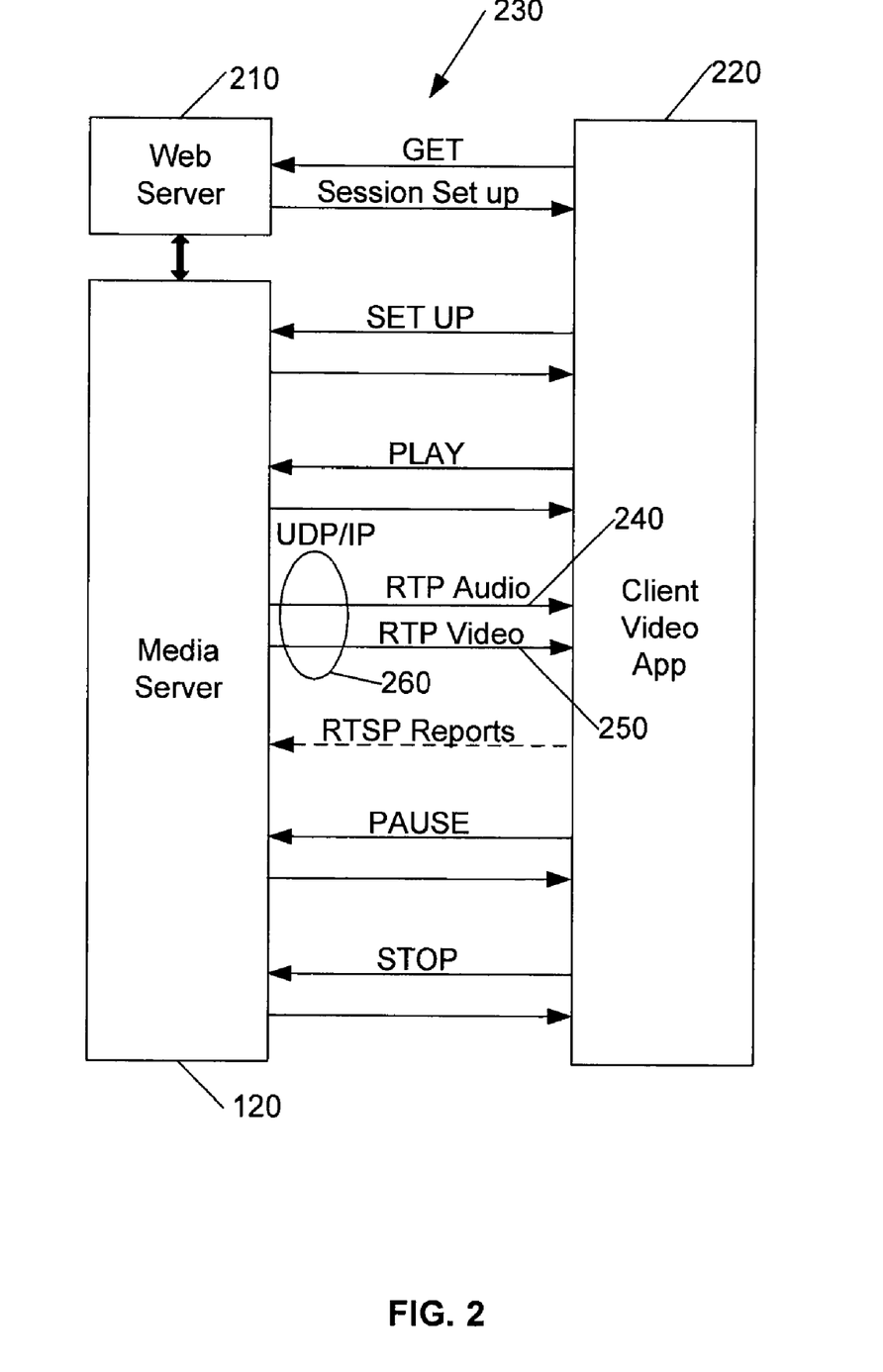
FIG. 2 is a block diagram of elements of the multimedia distribution network of FIG. 1 indicating command and content flow.

Turning now to FIG. 2, FIG. 2 is a block diagram of elements of the multimedia distribution network 100 of FIG. 1 indicating command and content flow. In particular, media server 120 is shown in communication with a web server 210. Web server 210 preferably provides a web interface for media server 120. In some embodiments, media server 120 is combined with web server 210.

In one embodiment, web server 210 includes a session initiated or initiation protocol ("SIP") which is used to set up a multimedia session for media server 120. The SIP protocol is only an example, and set up may be implemented using a different protocol with similar functionality.

Also shown in FIG. 2 is a client video application or multi media application 220. In one embodiment, client video application 220 resides in STB 160. The other elements of the network 100 of FIG. 1, which facilitate communication between the web server 210, the media server 120 and the client's video application 220, are not shown in FIG. 2 for clients.

In one embodiment, all the communication 230 indicated by the arrows in FIG. 2 utilize transmission control protocol ("TCP")/internet protocol ("IP") for real time streaming protocol ("RTSP") communications. Two exceptions are the real time protocol ("RTP") audio stream 240 and video stream 250. In one embodiment, these two streams 240, 250 are transmitted utilizing the user datagram protocol ("UDP")/IP indicated as 260.

In operation, a multimedia session is initiated or set up with SIP on web server 210. Such a session is typically initiated by client video application 220. Client video application 220 instructs media server 120 to stream content UDP/IP 260. In some embodiments, client video application 220 communicates with media server 120 to do additional set up, command and control functions via TCP/IP.

TCP/IP has a number of advantages, such as providing automatic data retransmission, data bite sequence numbering, multiple connections to a single port and universal availability. However, TCP/IP has disadvantages including requiring connection set up, relatively high overhead, flow control (the sequencing and rate that data transfers occur, e.g., reducing packet size as latency increases, high latency for retransmissions and reduced through-put due to delays). Additionally, TCP/IP is not time-synchronized. Rather, TCP/IP packets use a guaranteed delivery scheme which means it is more important that the packets reach the destination regardless of any time delay as opposed to in a precisely timed manner. This can introduce time gaps between packets which manifest as pauses or stalls in a media stream.

The use of UDP/IP provides a different set of advantages and disadvantages. The advantages include that it is connectionless, has low overhead, uses a simple port addressing scheme, offers very fast set up with low delays, has a flexible architecture, is widely available, and is time-sensitive. Its disadvantages include unreliable transport, potential firewall blocking, no built-in communications back channel between the transmitter and receiver, and no automatic rate control function.

Figure 3:
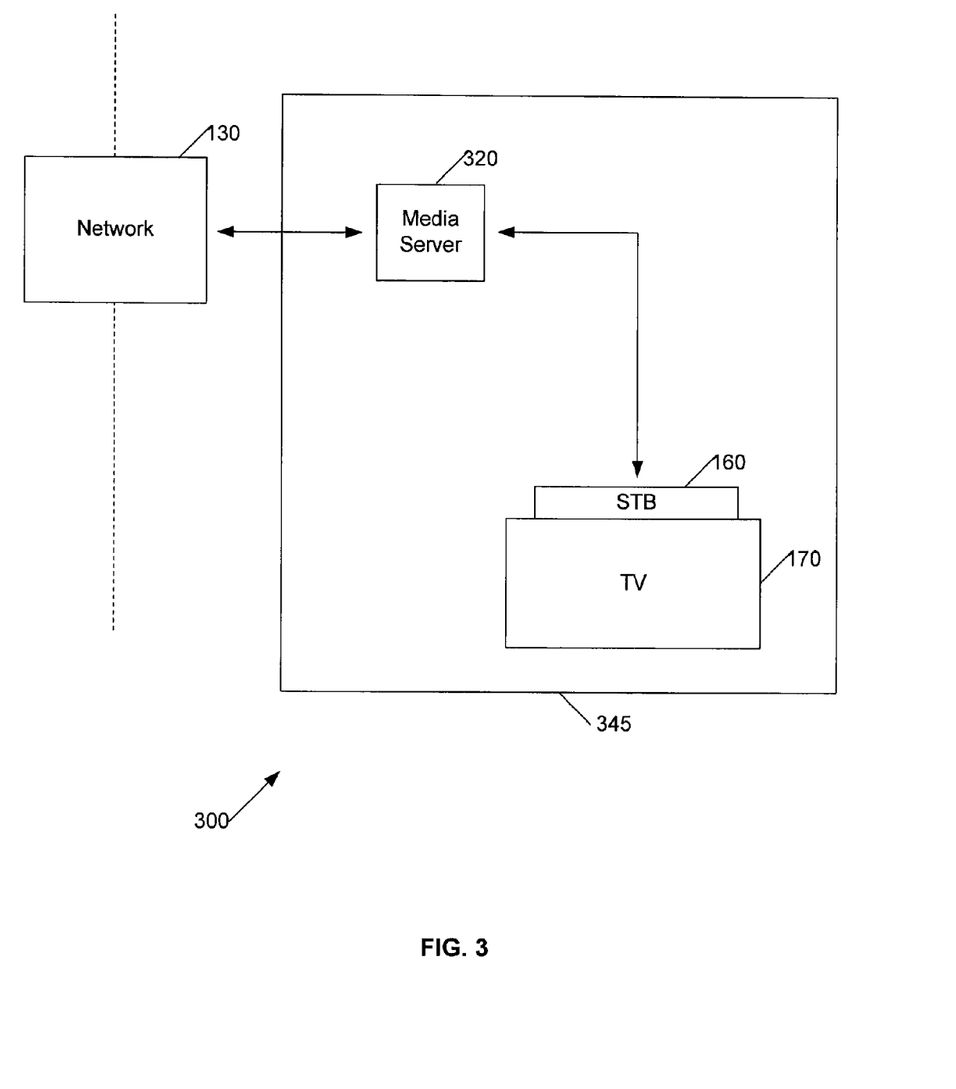
FIG. 3 is a block diagram of a portion of an exemplary multimedia distribution network.

Referring now to FIG. 3, FIG. 3 is a block diagram of a portion of an exemplary multimedia distribution network 300. In one embodiment, FIG. 3 depicts an alternative home site 345 to that of home site 145 from FIG. 1. In the present embodiment, a media server 320 is depicted as residing in the home environment and performing the functions of CSU/DSU 140 and router 150. For example, media server 320 receives media from a media source 110 (See FIG. 1), which may reside on either the distribution site 115 and/or the home site 345. In some embodiments, media server 320 also performs the function of distributing information and media to and from various devices on the home site 345 of the network 300.

Communication between STB 160 or client media applications 220 and media server 320 can proceed in the same manner as those described in connection with FIG. 2. In the case where the connection between the media server 320 and STB 160 is wireless, the delivery of a single channel of HDTV between the media server 320 and STB 160 may require a sustained data rate of 20 megabits per second over the wireless connection from media server 320 to STB 160. Such a sustained high band width connection is difficult to maintain in many environments. For example, dropped packets which contain video data, audio data or control data which were sent via UDP/IP can result in artifacts and degradation of the video image.

Figure 4:
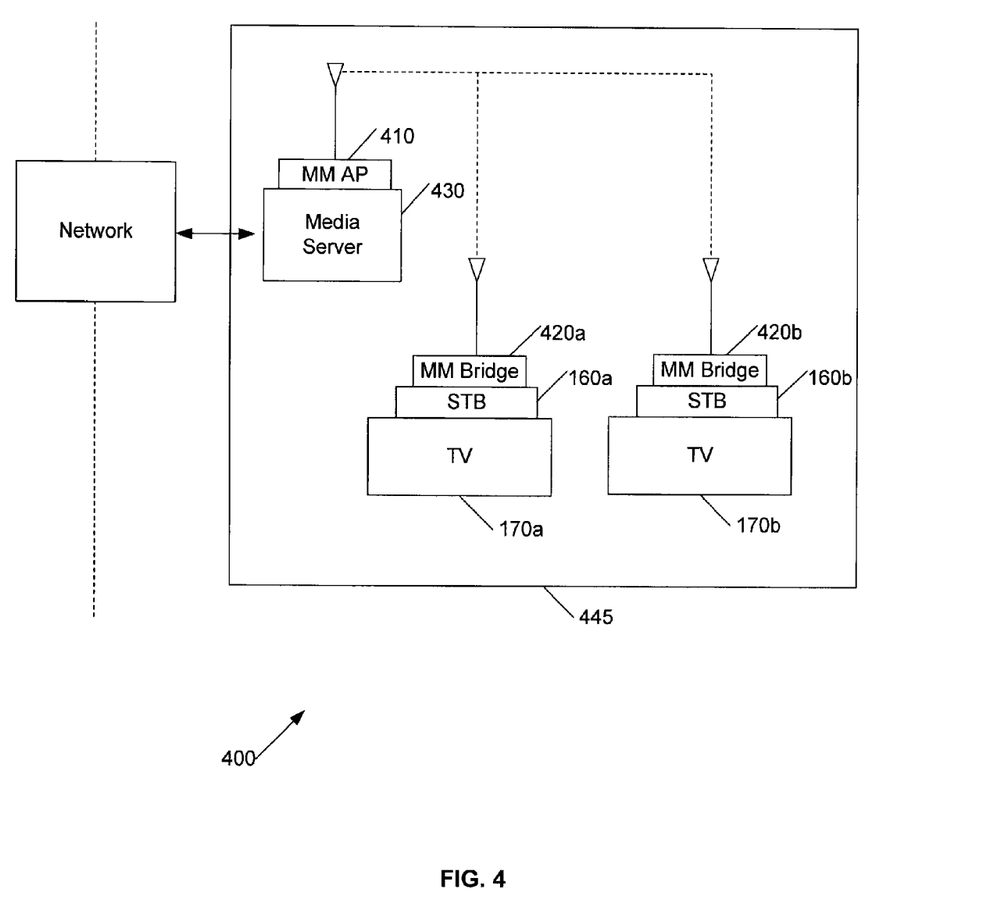
FIG. 4 is a block diagram of a portion of an exemplary multimedia distribution network.

Referring now to FIG. 4, FIG. 4 is a block diagram of a portion of an exemplary multimedia distribution network 400. In one embodiment, FIG. 4 depicts an alternative home site 445 to that of home site 145 from FIG. 1 and home site 345 from FIG. 3. In the embodiment depicted in FIG. 4, the media server 430 is provided with a multimedia access point 410. Each of the STBs 160a,b is provided with a multimedia bridge 420a,b. Bridge 420a,b can be, for example, an 802.11 (g) or (n) client and may also provide data sequencing control mechanisms as well as communications back to a proxy (not shown) providing hinting methods so that the proxy (not shown) can more effectively communicate through bridge 420a,b.

In some embodiments, multimedia access point 410 is in communication with media server 430 and provides for wireless communication with each of the multimedia bridges 420a,b. Similarly, each of the multimedia bridges 420a,b is in communication with its associated STB 160a,b and provides wireless communication with multimedia access point 410. In some embodiments, media server 430 and media source 110 can be located remotely from multimedia access point 410 (see FIG. 1). Additionally, multimedia bridges 420a,b can be incorporated directly into STBs 160a,b.

As described above with respect to FIG. 3, media server 430 is similarly depicted as residing in the home environment and performing the functions of CSU/DSU 140 and router 150. For example, media server 430 receives media from a media source 110 (See FIG. 1), which may reside on either the distribution site 115 and/or the home site 445. In some embodiments, media server 430 also performs the function of distributing information and media to and from various devices on the home site 445 of the network 400. Additionally, in some embodiments, media server 430 may be replaced by or include another device or additional functions such as a voice over internet protocol {"VOIP") server.

Multimedia access point 410 can be combined with other devices in the system such as media server 430. In some embodiments, multimedia access point 410 can be combined with router 150, depicted in FIG. 1. The combination multimedia access point 410/router 150 may perform the function of distributing information and media to and from various devices on the home site 445 of the network 400.

Figure 5:
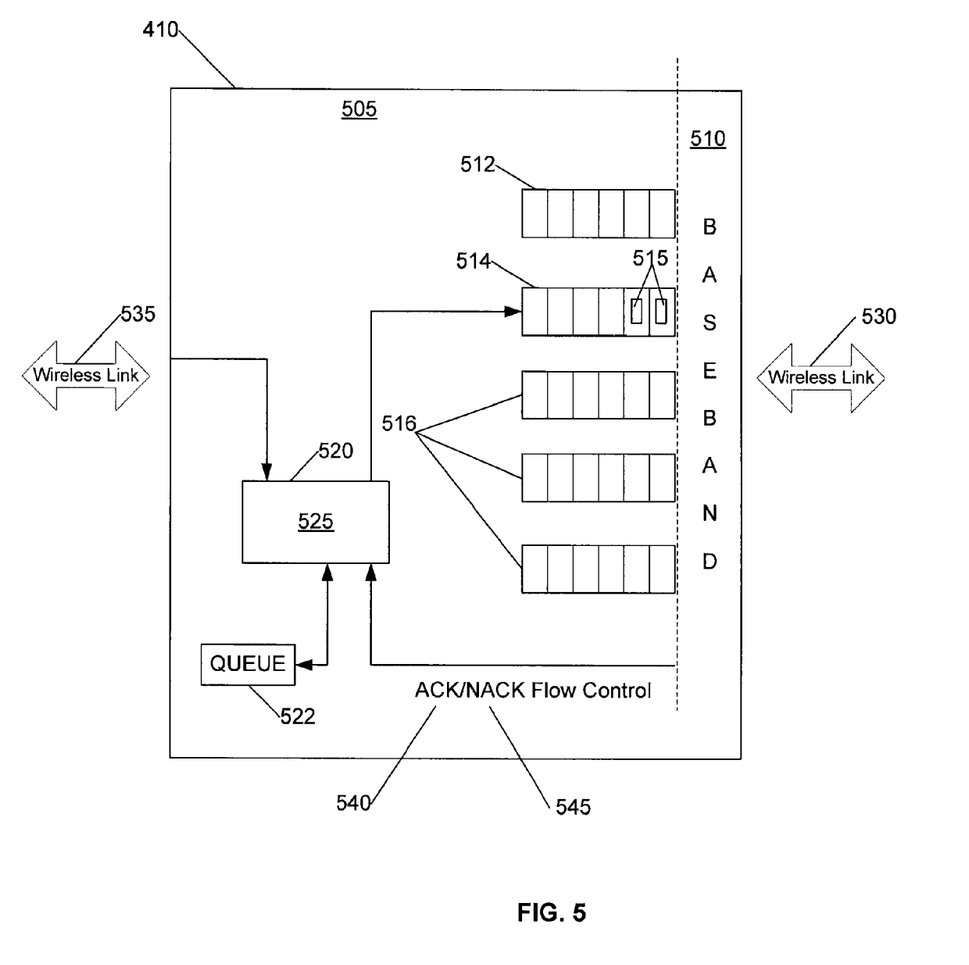
FIG. 5 is more detailed block diagram of the access point of FIG. 4.

Turning now to FIG. 5, FIG. 5 is a more detailed block representation of access point 410 from FIG. 4. The access point 410 generally includes the functional sections of an application sections or module 505 and a base band or radio portion or module 510. Each of these functional sections can be implemented on a separate processor or a separate processor core. The radio 510 of multimedia access point 410 implements a wireless communication protocol, for example, IEEE 802.11(g) or (n) to create the wireless link 530 with multimedia bridges 420a,b. In one embodiment, access point 410 includes a radio buffer 512 from which the radio 510 pulls packets of information to be transmitted over wireless link 530. A video buffer 514 is used to store packets of video information 515 which are to be moved to the radio buffer 512 to be transmitted. Additional buffers 516 may also be included for buffering additional types and classes (e.g., best effort transmissions) of packets to be transmitted over wireless link 530. The size (amount of storage) of the buffers can be selected based upon performance and cost criteria.

In one embodiment, an information management module 520 manages the flow of multimedia data (or other types of data, if desired). For example, information management module 520 can manage the flow of multimedia data, packet data, VOIP data, etc. It should be understood that information management module 520 is a functional section or module which can be implemented by various devices, such as a proxy module, a filter module, a combination proxy-filter module, etc. While information management module 520 is shown as managing the flow of multimedia data, other modules for implementing other functionalities may be included in module 505 (e.g., routing).

In one embodiment, information management module 520 is implemented as one or more proxy modules 525. Proxy module 525 implements an RTSP/RTP proxy instance for each client video application 220 (hereinafter also referred to as an RTSP/RTP client) running behind each of the multimedia bridges 420a,b. The proxy module 525 can be implemented in the processor 505. A data queue or cache 522 is associated with each proxy instance (and RTSP/RTP client). In one embodiment, queue 522 is implemented through a media server, such as media server 430.

In one embodiment, media server 430 transmits video packets to queue 522 within access point 410. Media server 430 may implement a wireless communication protocol, for example, IEEE 802.11(g) or (n) to create a wireless link 535 with access point 410. Queue 522 holds a selected number of received video packets and a selected number of packets that have previously been passed on to video buffer 514 for transmission over wireless link 530.

As radio 510 receives an acknowledgment ("ACK") 540 that a transmitted video packet has been received by the intended multimedia bridge 420a, b, a message (indicated as 540) or indication that the ACK has been received is forwarded or provided to proxy 525. Proxy 525 then removes the received, acknowledged packet from queue 522. In one embodiment, the acknowledgment is a phy or physical layer acknowledgment of IEEE 802.11(g) or (n). An ACK 540 is generally received within milliseconds after transmitting a video packet.

Radio 510 will know (or assume) that a packet was not successfully received by the intended multimedia bridge 420a,b if: (1) it does not receive an ACK 540 within a time limit (e.g., "time out") or (2) it receives a negative acknowledgment ("NACK") 545 from the intended multimedia bridge 420a,b. A NACK indicates that the packet was received but the packet was corrupted. In some embodiments, radio 510 will make a selected number of attempts to retransmit the packet. Alternatively, retransmission attempts can be limited by a predetermined time period or a combination of a number of attempts and a predetermined time period. If successful transmission is not accomplished within the selected number of attempts and/or the time period, radio 510 drops the packet from radio buffer 512, resulting in a failed delivery cycle for the radio.

The radio 510 generally keeps a packet for a certain number of attempts or a certain duration of time. When the radio 510 knows that a packet was not successfully received by the intended multimedia bridge (a failed delivery cycle), the proxy 525 receives that information. Depending on the architecture of radio 510, radio 510 can generate a message indicating that transmission of a packet was not successful or another piece of software can monitor radio 510, detect the transmission failure, and generate the message to proxy 525.

For example, the radio 510 drops a packet by freeing up memory in radio buffer 512. In one embodiment, information management module 520, such as proxy 525, monitors the memory in radio buffer 512 and can determine why the radio is dropping a packet from the buffer, e.g., the packet's status. For example, proxy 525 can determine if radio 510 did not receive an ACK 540 within a time limit for the packet or if radio 510 received a NACK 545 from the intended multimedia bridge 420a,b.

When proxy 525 receives the information that transmission of a packet has failed, it then resends the failed packet from queue 522 to video buffer 514 so that it will be resent by radio 510. Additionally, the proxy can resend a failed packet from the queue to the video buffer a predetermined number of times and/or within a predetermined time period. In one embodiment, proxy 525 controls the number of packets placed in video buffer 514 (e.g., limit it to two) in order to have very fine control over how quickly a resubmitted packet is retransmitted by radio 510 as well as control the number of packets that can be resent out of order, thus complying with the limited re-ordering capabilities of an RTSP/RTP client.

While the above example discussed how video packets can be resent to replace lost or corrupted packets, other types and classes of packets can be resent in the same manner. Additionally, it is important to note that the present embodiments connect together several protocol layers to accomplish intelligent and fast retransmission of packets that are lost during over the air ("OTA") or wireless transmissions. For example, in a standard retransmission-based high reliability protocol like TCP/IP, the retransmission may be initiated by an application layer in the protocol when a set time has elapsed from the original transmission and no acknowledgement of the receipt of the packet has been received from the receiving application. In some embodiments, there are no timeouts; rather, the retransmission is based on directly utilizing the radio/physical layer acknowledgement function, which is much faster and is normally used to manage the radio and rate-setting functions at the media access control ("MAC") layer.

One aspect to having a useful retransmission function in a time-critical media application is the speed at which the retransmission cycle can occur. For example, some media (e.g., video) rendering applications need to be able to receive all the transmitted packets for each video frame before the decompression/decoding function can start.

Longer retransmission cycle times can be accommodated by installing a buffer (not shown) on both sides of the wireless link 530. In one embodiment, the buffer in the access point 410 is in addition to the queue 522. Alternatively, the queue 522 can be made larger. However, buffers increase the latency and response time, as well as the memory requirement and cost of the system. For example, if the inherent reliability of the link (e.g., percentage of dropped packets) is $10^{-2}$ packets lost, one attempt at a retransmission over the same link will result in a number of dropped packets at $10^{-4}$. Two rounds of retransmissions would make this $10^{-6}$, and so forth. If there is time for additional retransmissions, and assuming the same probability for dropped packets for each attempt, it is possible to reduce the portion of dropped packets further.

Using lower layer (e.g., phy) acknowledgements as the criteria for retransmission can keep the retransmission cycle time down to a few milliseconds, which is an order of magnitude less than typical buffer length times in media networking devices. The need for buffer storage capacity is further reduced by the solution to discard the packets from queue 522 as soon as a positive radio ACK 540 has been received.

In a further embodiment, an application is installed on both the multimedia access point 410 side (transmit side) and the multimedia bridge 420a,b side (receive side). Each packet is issued a sequence number each time it is transmitted. The multimedia bridge 420a,b side can then detect if any of the sequence numbered packets are missing from the received packets and immediately trigger a request for retransmission. In one embodiment, retransmitted packets are issued a new sequence number, resulting in several nested sequence numbers on the packets when they finally arrive at the multimedia bridge 420a,b side. In a preferred embodiment, the multimedia bridge 420a,b side includes the functionality (or a module) to re-order the packets according to their original sequence numbers and then remove the sequence numbers.

In some embodiments, proxy 525 uses command functions available through RTSP/RTP to minimize the impact of delays due to resending packets. For example, proxy 525 can monitor queue 522, and when queue 522 is getting full, proxy 525 can pause the video stream (e.g., from the media server) to stop the flow of video packets from media server 430 in order to give proxy 525, bridges 420a,b and STBs 160a,b, time to catch up or lower the level in their queues. Pausing the intake of packets is generally preferable to dropping packets. Additionally, proxy 525 can determine to discard selected packets when the age of packets in queue 522 reach a certain point.

In some embodiments, proxy 525 can implement trick play such as fast forward by inline frame ("IFrame") skipping instead of sending frames faster. One way of implementing IFrame skipping is to utilize available quality of service ("QoS") functions of multimedia access points and communication protocol, assigning highest priority to IFrame packets and lower priorities to predictive frames ("PFrames") and bi-directional frames ("BFrames"). In this way, the available bandwidth is used to provide as much information as possible while ensuring that the IFrames are all delivered.

Additionally, proxy 525 can split the audio from video packets in order to prioritize them separately, with video generally having a higher priority. Proxy 525 can also take an active role in the RSTP reporting mechanism to limit or prevent potentially unnecessary, additional packets from consuming wireless bandwidth.

Figure 6:
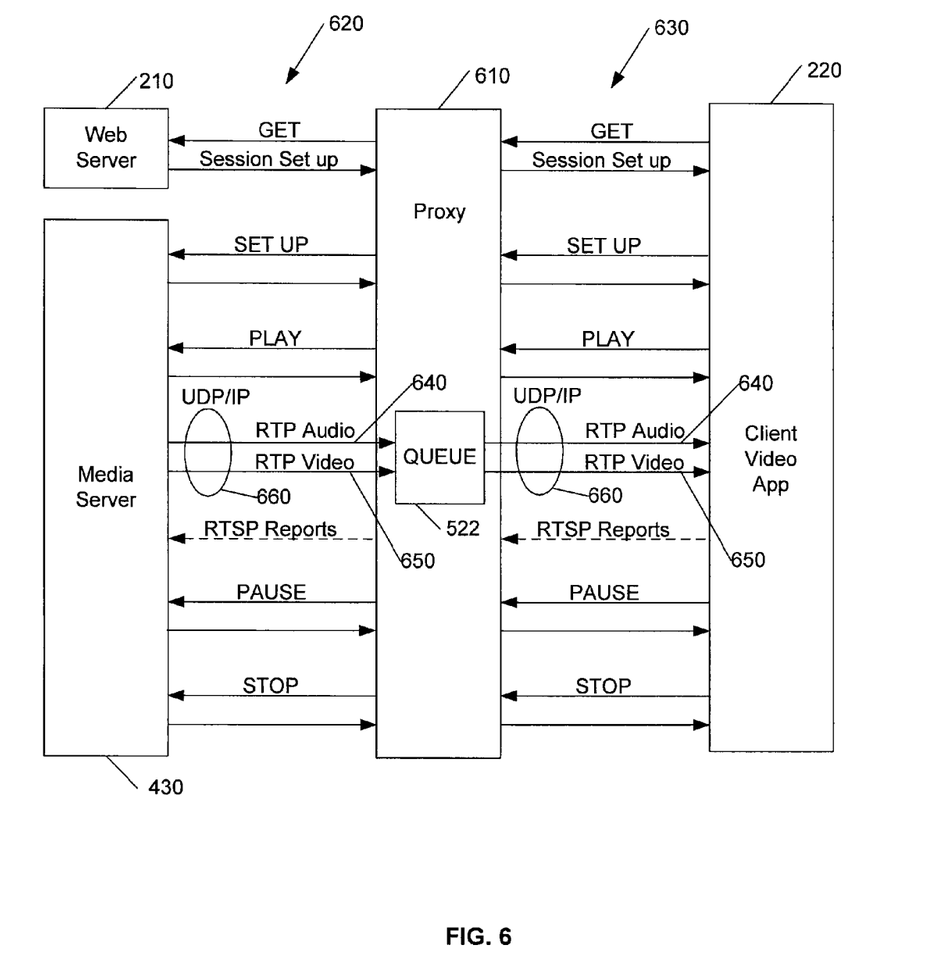
FIG. 6 is a block diagram of elements of the multimedia distribution network of FIG. 4 indicating command and content flow.

Referring now to FIG. 6, FIG. 6 is a block diagram of elements of a multimedia distribution network of FIG. 4 indicating command and content flow. In this figure, the functions of the multimedia access point 410 are represented by proxy 610. Proxy 610 and proxy 525 are generally interchangeable.

In one embodiment, all the communication 620, 630 indicated by the arrows in FIG. 6 utilize TCP/IP for the RTSP communications. Two exceptions are RTP audio stream 640 and video stream 650, which go from media server 420 to client video application 220. In one embodiment, these two streams 640, 650 are transmitted utilizing UDP/IP.

Similar to the description above in connection with FIG. 2, a multimedia session is initiated or set up with SIP, or a server implementing similar functionality, on web server 410. Such a session is typically initiated by client video application 220 with client video application 220 instructing media server 420 to stream content via RTP/UDP. In some embodiments, client video application 220 communicates with media server 420 to do additional set up, command and control functions via TCP/IP. The other elements of the network 400 of FIG. 4, which facilitate communication between the web server 210, the media server 420 and the client's video application 220, are not shown in FIG. 6 for clients.

In FIG. 6, all communications between media server 420 and web server 210 and client video application 220 flow through the proxy 610. Communications 620 are the communications flowing between media server 420 and proxy 610 and communication 630 are the communications flowing between proxy 610 and client video application 220. Because all of the communications flow through proxy 610, proxy 610 is able to perform the enhanced functions described above in connection with FIG. 5 (and proxy 525) while still using standard protocols.

In another embodiment, an alternative mechanism for intercepting packets in access point 410 performs the functions of buffering and retransmission. Such packet interception systems have been implemented, for example, in smart antenna control systems where the antenna switching is coordinated with the packet traffic and the destination client devices. In smart antenna systems, a rapid retransmission system is built into the software stack so that the functions are abstracted from both access point functions and from protocol/proxy server functions using a standard abstraction layer. This leads to a generic packet loss reduction system that can be implemented for any class of packets flowing through the access point. For example, the functions can be applied to all UDP packets, or to all multicast transmission packets, since these classes of packets are often carrying time-sensitive media streaming information.

In another embodiment, the functions of buffering and retransmission are distributed between access point 410 and the client device(s). In this case the actual proxy server functions are at the client device (the receiving side of the media streaming, e.g., multimedia bridge 420a,b). In some embodiments, a buffer (not shown) is on the receiving side (e.g., multimedia bridge 420a,b). In addition, the receive side (e.g., multimedia bridge 420a,b) can include a facility to reorder the packets before transmitting them to the receiving application (e.g., STB 160a,b, TV 170a,b). In this implementation, there is a smaller proxy-slave function at access point 410 to facilitate selection of the appropriate streams for each client, etc.

In some embodiments, system 400 controls what the content of the last set of packets will be if the receive side buffer (not shown) runs out of packets. This "packet outage" may be caused by interruption of the flow or by long interference in the wireless link or other part of the communication channel. The specific objective for this control ensures that a complete picture frame is provided by the last packets transmitted before a pause. The benefit of this control is that when the rendering application senses the end of the packet stream and freezes the last frame on the video screen, the frame will be a complete one without any artifacts that could be caused by incomplete set of packets. In this way the viewer experience will be of a paused stream that can resume as soon as the interruption of the packet flow has ended. This may be considered a better alternative than a distorted frame.

In addition to the functions described above, proxy 610 can also be used to include further enhancements to the streaming media at the access point/client level. One such enhancement includes providing compression and/or an additional layer of encryption to protect media stream data during its transmission over the air.

In a further embodiment, the functionality of the information management module 520 is implemented as a packet filter. In one instantiation, proxy 620 additionally includes a packet filter module (not shown) or may be replaced by a packet filter module 710 (see FIG. 7). Packet filter 710 can achieve the same results as proxy 620 without the need to implement a proxy and without being limited to RTSP/RTP.

Figure 7:
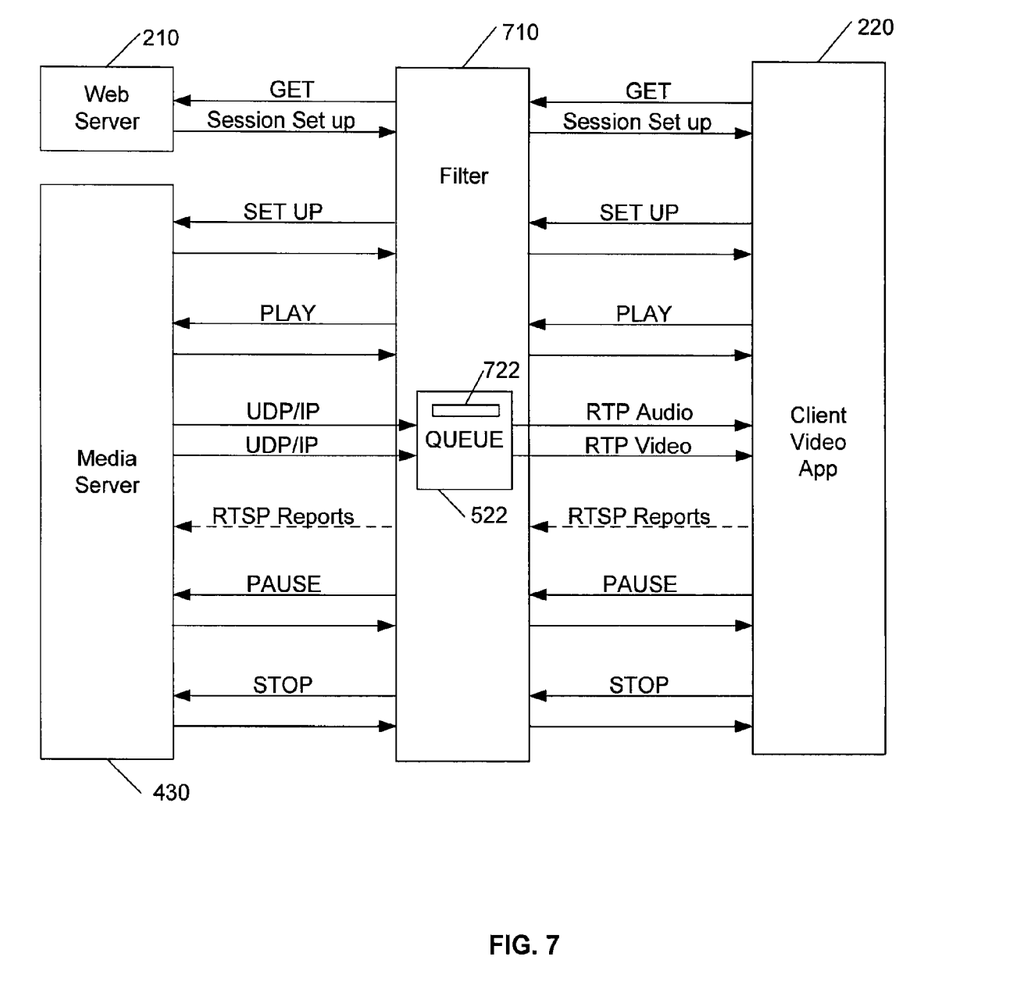
FIG. 7 is an alternate block diagram of elements of the multimedia distribution network of FIG. 4 indicating command and content flow.

In one embodiment, application module 505 of access point 410 includes router functionality. For example, module 505 may implement functionality to distribute information, including media, to and from various devices on the home site 445 of the network 400. In one embodiment, packet filter 710 is a Linux packet filter that can be implemented in an application processor including the access point 410. The IP addresses of selected clients of access point 410 are provided to filter 710, for example, when access point 410 is installed or when new clients register with access point 410, for example. Filter 710 then intercepts all UDP packets to and from the registered IP addresses. Thus, filter 710 can be applied to all UDP traffic for a selected IP address.

In some embodiments, filter 710 includes queue 522 which holds a selected number of received (from media server 430) video packets and a selected number of packets that have previously been passed on to video buffer 514 for transmission over wireless link 530. Similar as described with respect to FIG. 5, when radio 510 receives an acknowledgment ("ACK") 540 that a transmitted video packet has been received by the intended multimedia bridge 420a,b, filter 710 receives ACK 540 and removes the packet from queue 522. In one embodiment, the acknowledgment (or negative acknowledgment) is the phy or physical layer acknowledgment of IEEE 802.11(g) or (n).

In one embodiment, filter 710 includes a virtual queue 722 for each IP address it monitors. Virtual queue 722 can be a list of packets. When a packet is needed, filter 710 can retrieve it from media server 430.

Radio 510 will know that a packet was not successfully received by the intended multimedia bridge 420a,b, if it does not receive an ACK 540 within a time limit or if it receives NACK 545, indicating that a received packet was corrupted. In either of those cases, radio 510 will make a selected number of attempts to retransmit the packet. If successful transmission is not accomplished within the selected number of attempts, radio 510 drops the packet, resulting in a failed delivery cycle. When a failed delivery cycle occurs, radio 510 ceases transmitting the failed packets.

Filter 710 receives the information that radio 510 has failed to successfully transmit the packet. Filter 710 can then resend the failed packet from queue 522 to video buffer 514 so that it will be resent by the radio 510. Filter 710 can also control the number of packets placed in the video buffer 514 (e.g. limit it to two) in order to have some control over how quickly a resubmitted packet is retransmitted by radio 710 as well as control the number of packets that can be resent out of order, thus complying with the limited re-ordering capabilities of a client media application 220. Filter 710 can resend a failed packet a selected number of times before it is dropped.

Filter 710, alone or in combination with proxy 610, can also use the command functions available through RTSP/RTP to minimize the impact of delays due to resending packets when the packets being intercepted. For example, proxy 610 can monitor filter 710's queue 522. In one embodiment, when queue 522 is getting full, proxy 610 sends a command to media server 430 to pause the video stream to stop the flow of video packets from media server 430. This can be done in order to give filter 710, bridges 420*a,b* and STBs 160*a,b* time to catch up, which in some embodiments is preferable to dropping video packets.

The command to media server 430 to pause the video stream may be achieved by command "spoofing". For example, in one embodiment, filter 710 sends the pause command by sending a packet that appears to media server 430 to have been sent from the client.

In some embodiments, filter 710 determines whether to discard selected packets when the age of packets in queue 522 reach a certain point or age. Filter 710 can also implement trick play such as fast forward by IFrame skipping and can split the audio from video packets in order to prioritize them separately, similar to as described above with respect to proxy 610. Filter can 710 also take an active role in the RSTP reporting mechanism to limit or prevent these potentially unnecessary, additional packets from consuming wireless bandwidth.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. For example, the various illustrative modules disclosed herein can be implemented as software or stored as instructions on a storage medium, a processor, or an application specific integrated circuit ("ASIC"). To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an ASIC, a field programmable gate array ("FPGA") or other programmable logic device, discrete gate or transistor logic, discrete hardware components, or any combination thereof designed to perform the functions described herein. A general-purpose hardware processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. An access point device for providing an information packet to a user device comprising:
   an application module comprising an information management module, a queue, and a buffer, the application module configured to receive an information packet for transmission to an intended recipient; and
   a radio module configured to transmit the information packet stored in the buffer to the user device and to determine if the information packet was successfully received at the user device,
   wherein the information packet is stored in the queue and the information packet is passed from the queue to the buffer for transmission by the radio module to the user device, the information management module receives information from the radio module indicating whether the information packet was successfully received by the intended recipient, if the information packet was not successfully received at the user device the information packet is again passed from the queue to the buffer for retransmission by the radio module;
   wherein the information packet is transmitted to the access point by a media server and the information management module is configured to stop the information packet being received at the application module by sending a command to the media server to stop the flow of information packets from the media server;
   wherein the information management module comprises a filter module configured to filter packets for defined recipients, the filter module sending the command to the media server to stop the flow of information packets from the media server by sending a command that appears to the media server to have been sent from the intended recipient.

2. The access point device according to claim 1, wherein the information packet is deleted from the queue if the information packet was successfully received by the intended recipient.

3. The access point device according to claim 1, wherein the radio module is further configured to provide an indication to the information management module that the packet was not received by the intended recipient when the radio module receives a negative acknowledgment from the intended recipient.

4. The access point device according to claim 1, wherein an information packet is deleted from the queue when the information packet within the queue reaches a predetermined age.

5. The access point device according to claim 1, wherein the information management module compresses and encrypts the information packet before it is placed in the buffer.

* * * * *